United States Patent
Vishwanath et al.

(10) Patent No.: US 7,657,591 B2
(45) Date of Patent: Feb. 2, 2010

(54) DISPATCHING CLIENT REQUESTS TO APPROPRIATE SERVER-SIDE METHODS

(75) Inventors: Tirunelveli R. Vishwanath, Redmond, WA (US); Stephen J. Maine, Seattle, WA (US); Clemens Friedrich Vasters, Kirkland, WA (US); Brian Matthew McNamara, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/678,522

(22) Filed: Feb. 23, 2007

(65) Prior Publication Data

US 2008/0208979 A1 Aug. 28, 2008

(51) Int. Cl.
G06F 15/16 (2006.01)

(52) U.S. Cl. .................. 709/201; 709/203; 709/218

(58) Field of Classification Search ............ 370/466, 370/469, 471; 707/6, 7, 10, 201; 709/203, 709/205, 214, 220, 226, 228, 229; 719/316, 719/332

See application file for complete search history.

(56) References Cited

U.S. PATENT DOCUMENTS

| | | | |
|---|---|---|---|
| 6,629,127 B1 * | 9/2003 | Deen et al. ............... | 709/203 |
| 6,826,626 B1 * | 11/2004 | McManus .................. | 709/246 |
| 6,895,433 B1 * | 5/2005 | Slater et al. ............... | 709/220 |
| 7,240,100 B1 * | 7/2007 | Wein et al. ................ | 709/214 |
| 7,266,827 B1 * | 9/2007 | Sievert .................... | 719/330 |
| 2003/0009519 A1 * | 1/2003 | Gosling et al. ............ | 709/203 |
| 2004/0030788 A1 * | 2/2004 | Cimo et al. ............... | 709/229 |
| 2004/0179035 A1 * | 9/2004 | Ullmann et al. ............ | 345/745 |
| 2005/0246717 A1 * | 11/2005 | Poole et al. ............... | 719/316 |
| 2006/0085421 A1 * | 4/2006 | Backhouse et al. ......... | 707/10 |
| 2008/0144655 A1 * | 6/2008 | Beam et al. ............... | 370/466 |

OTHER PUBLICATIONS

Clemens Vasters: Alien Abductions Enterprises, "Teaching Indigo to do REST/POX, Part 1", Dec. 8, 2005, 7 pages.
Clemens Vasters: Alien Abductions Enterprises, Teaching Indigo to do REST/POX, Part 2, Dec. 12, 2005, 10 pages.
Clemens Vasters: Alien Abductions Enterprises, "Teaching Indigo to do REST/POX: Part 3", Dec. 27, 2005, 7 pages.
Clemens Vasters: Alien Abductions Enterprises, "Teaching Indigo to do REST/POX: Part 4", Dec. 28, 2005, 9 pages.
Clemens Vasters: Alien Abductions Enterprises, "Teaching Indigo to do REST/POX: Part 5", Dec. 29, 2005, 12 pages.

(Continued)

*Primary Examiner*—Wing F Chan
*Assistant Examiner*—Jonathan Willis
(74) *Attorney, Agent, or Firm*—Workman Nydegger

(57) ABSTRACT

The present invention extends to methods, systems, and computer program products for dispatching client requests to appropriate server-side methods. When a client request is received, a Web server refers to a service contract framework that maps URI paths and HTTP methods to corresponding server implemented methods. A server implemented method corresponding to a URI path and/or an HTTP method included in the client request is identified. The server implemented method is invoked to process the client request message. Accordingly, embodiments of the invention provide a uniform mechanism to dispatch HTTP requests to designated server implemented methods based solely on URI path and HTTP method. That is, an HTTP request can be dispatched to a designated server implemented method without having to include additional dispatch metadata within the HTTP request (e.g., in a SOAP envelope).

20 Claims, 2 Drawing Sheets

OTHER PUBLICATIONS

Clemens Vasters: Alien Abductions Enterprises, "Teaching Indigo to do REST/POX: Part 6", Jan. 2, 2006, 8 pages.
Clemens Vasters: Alien Abductions Enterprises, "Teaching Indigo to do REST/POX: Part 7", Jan. 4, 2006, 12 pages.
Clemens Vasters: Alien Abductions Enterprises, "Teaching Indigo to do REST/POX: Part 8", Jan. 5, 2006, 11 pages.
Clemens Vasters: Alien Abductions Enterprises, "Teaching Indigo to do REST/POX: Part 9 (final part)", Jan. 9, 2006, 7 pages.

* cited by examiner

DISPATCHING CLIENT REQUESTS TO APPROPRIATE SERVER-SIDE METHODS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content from or provide content to a "Web server". Requests on the WWW are often transported using Hypertext Transfer Protocol ("HTTP") (hereinafter referred to as HTTP requests).

An HTTP request typically includes at least a method token followed by a request URL. A method token indicates a HTTP Verb (or method), such as, for example, GET, POST, PUT, etc., that is to be performed on the resource identified by the request URL A request URL typically includes some combination of a protocol indicator portion, a domain name portion, a path portion, and a resource portion. The protocol indicator portion indicates a protocol (e.g., HTTP, FTP, etc.) used to transfer the URL. The domain portion identifies a domain where a resource is located. The path portion indicates the location of the resource within the domain (or the path on the domain). The resource portion indicates what is at the location (e.g., a file, Web page, etc).

Accordingly, the combination of a method token and request URL are communicated to a Web server to indicate to the Web server that an HTTP verb action is to be performed on the resource identified by the request URL. Thus, when a URL identifies a portion of data (e.g., a file or Web page), the Web server can return the data to the Web browser (e.g., in response to a GET verb) or update the data (e.g., in response to a PUT verb) in accordance with the Web browser's request. However, URLs can also be used to identify services at a Web server.

In many environments, a request URL identifying a service does not necessarily correspond directly to the executable code that is executed to implement the service. For example, a request URL can identify a Web based electronic mail application without necessarily identifying (and in most cases does not identify) executable code that is executed to implement the Web based electronic mail application. Further, Web servers typically lack the functionality to dispatch a received HTTP request to an appropriate and corresponding portion of executable code when a contained request URL identifies a service.

Accordingly, at least two different techniques have been developed for a Web server to dispatch an HTTP request to appropriate server-side executable code. Using either of these techniques, for example, a Web server can dispatch an HTTP request containing a request URL for a Web based electronic mail application to executable code for presenting an electronic mail interface and performing other electronic mail related functions.

One technique includes a developer writing their own handler (or dispatch code) that binds to a specific URL and provides a single entry point to executable code. For example, a developer can create an API that processes HTTP requests (e.g., examining protocol data contained therein) for the specified URL. When an HTTP request containing the specified URL is identified, the API dispatches the HTTP request to the corresponding and appropriate executable code.

However, dispatch code is typically developed on a per application basis and for dispatching specified URLs to specified executable code (e.g., in a one to one correspondence). Further, dispatch code is typically subject to the coding nuances of the particular developer that wrote the dispatch code. Thus, environments using developer written dispatch code typically have no uniform way to dispatch HTTP requests.

Another technique includes adding additional metadata to an HTTP request (in addition to portions of an HTTP request defined by the HTTP specification, such as, for example, a method token and request URL). For example, dispatch metadata can be inserted into Simple Object Access Protocol ("SOAP") envelope that is then included in the body of an HTTP request along with a method token and request URL. A Web server that receives such an HTTP request can then process the additional dispatch metadata (e.g., a SOAP action) to determine how the HTTP request is to be dispatched to executable code at the Web server.

BRIEF SUMMARY

The present invention extends to methods, systems, and computer program products for dispatching client request to appropriate server-side methods. A server computer system receives a client request message that includes at least a request Uniform Resource Identifier (URI) and a HyperText Transfer Protocol (HTTP) method identifier. Reception of the client request message indicates to the server computer system that the HTTP method identified by the HTTP method identifier is to be performed on a resource identified by the request URI.

The server computer system extracts a URI path from the URI included in the received client request message. The server computer system refers to a service contract framework to identify a subset of server-side operations that can potentially process the identified HTTP method. Each of the subset of server-side operations is designated to process an HTTP method for a portion of a URI namespace of the server computer system that includes the extracted URI path.

The server computer system identifies a server-side operation, from among the subset of server-side operations, that is designated to process the identified HTTP method. The server computer system invokes a server implemented method corresponding to the identified server-side operation to process the client request message in response to identifying the identified server-side operation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
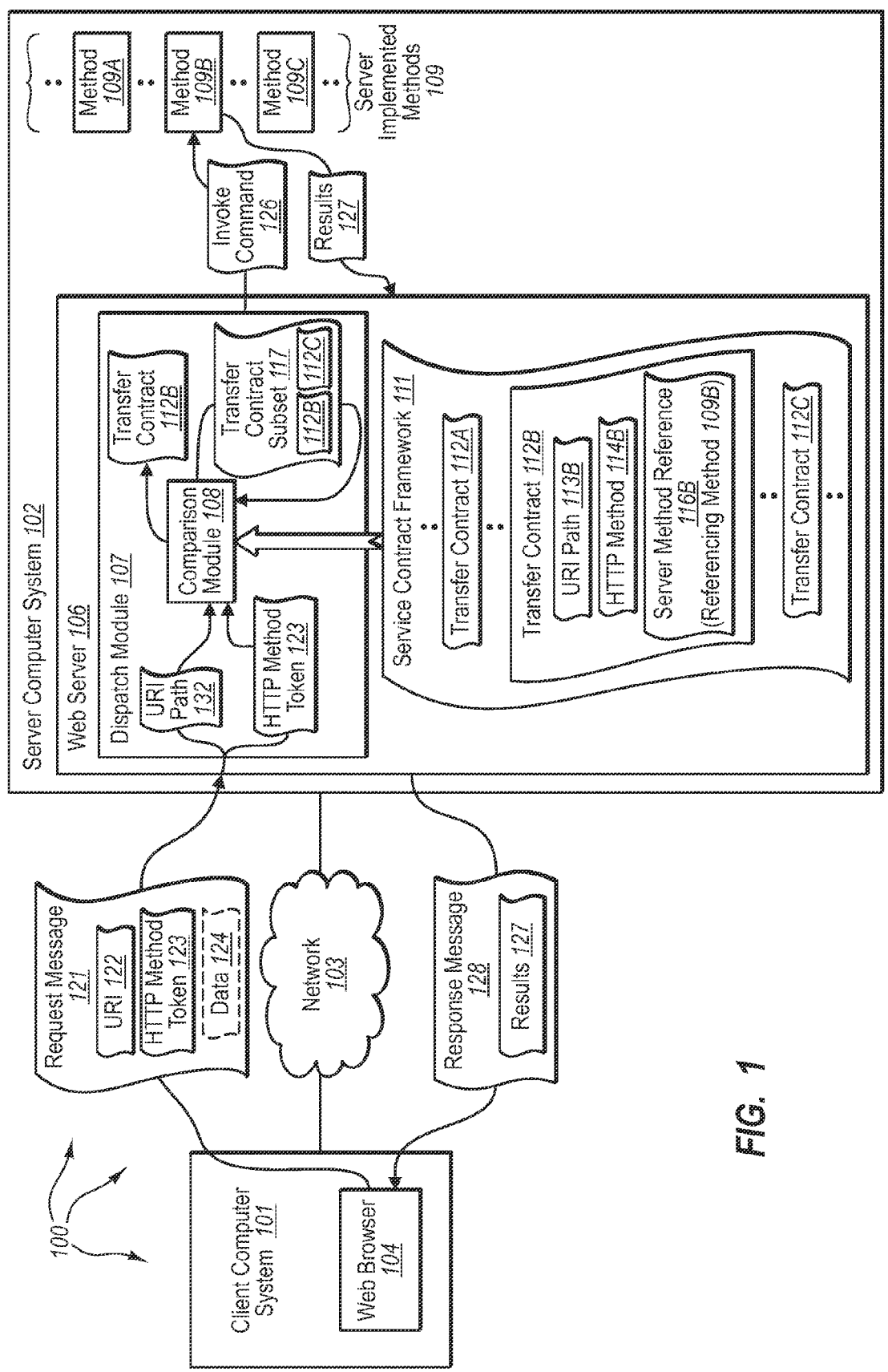
FIG. 1 illustrates an example computer architecture that facilitates dispatching client requests to appropriate server-side methods.

The present invention extends to methods, systems, and computer program products for dispatching client requests to appropriate server-side methods. A server computer system receives a client request message that includes at least a request Uniform Resource Identifier (URI) and a HyperText Transfer Protocol (HTTP) method identifier. Reception of the client request message indicates to the server computer system that the HTTP method identified by the HTTP method identifier is to be performed on a resource identified by the request URI.

The server computer system extracts a URI path from the URI included in the received client request message. The server computer system refers to a service contract framework to identify a subset of server-side operations that can potentially process the identified HTTP method. Each of the subset of server-side operations is designated to process an HTTP method for a portion of a URI namespace of the server computer system that includes the extracted URI path.

The server computer system identifies a server-side operation, from among the subset of server-side operations, that is designated to process the identified HTTP method. The server computer system invokes a server implemented method corresponding to the identified server-side operation to process the client request message in response to identifying the identified server-side operation.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates dispatching client requests to appropriate server-side methods. Depicted in computer architecture 100 are client computer system 101 and server computer system 102. Client computer system 101 and server computer system 102 are connected to network 103 which can be virtually any network or combination thereof, such as, for example, a Local Area Network ("LAN"), a Wide Area Network ("WAN"), and even the Internet. Accordingly, client computer system 101 and server computer system 102, as well as any other connected computer systems, can create message related data and exchange message related data (e.g., Internet Protocol ("IP")

datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network 103.

As depicted, computer system 101 includes Web browser 104. Web browser 104 can be configured to request and receive Web based content in response to received (either user-entered or automated) commands. Web browser 104 can also present Web based content as output at computer system 101. To request content or the performance of remote Web based operations (updating remote content), Web browser 104 can send a request message to an appropriate Web server. A request message can include a Uniform Resource Identifier ("URI") identifying a resource. A request message can also include an HTTP method token identifying an HTTP method (sometimes referred to as an HTTP verb), such as, for example, OPTIONS, GET, BEAD, POST, PUT, DELETE, TRACE, CONNECT, etc., that is to be performed on the resource identified by the URI.

Server computer system 102 includes Web server 106 and server implemented methods 109. Web server 106 is configured to respond to requests form client computer systems. Web server 106 can facilitate the delivery of content back to a client computer system in response to a client request for content (e.g., an HTTP GET). Web server 106 can also facilitate the updating of content at server computer system 102 in response to a client request (e.g., an HTTP PUT). Web server 106 can invoke methods within server implemented methods 109, such, as for example, method 109A, method 109B, or method 109C, to obtain content or update content in response to a client request. Web server 106 can also manage a server-side URI namespace used to identify available resources of server computer system 102.

Web server 106 includes dispatch module 107 and service contract framework 111. Service contract framework 111 can include one or more mappings between HTTP requests and handler methods that are declaratively specified in metadata. The metadata can be inspected by a dispatching mechanism (e.g., dispatch module 107) to determine how to route a received HTTP request to an appropriate handler method. As depicted, service contract framework 111 includes a plurality of transfer contracts 112A, 112B, 112C, etc. Each transfer contract corresponds to a specified service and maps a portion of the server-side URI namespace and an HTTP method to a corresponding designated server implemented method.

Dispatch module 108 can identify and invoke an appropriate server implemented method that is designated to be responsive to a client request. To identify an appropriate server implemented method, dispatch module 107 can refer to service contract framework 111. Dispatch module 107 includes comparison module 108. Comparison module 108 can compare a URI path and/or an identified HTTP method from a client request message to elements of transfer contracts within service contract framework 111 to identify a particular transfer contract that corresponds to the URI path and/or the identified HTTP method. Dispatch module 107 can then invoke the corresponding designated server implemented method for the particular transfer contract. Results from invoking a designated server implemented method (e.g., content or the results of a request to update content) can be returned back to a client computer system.

Figure 2:
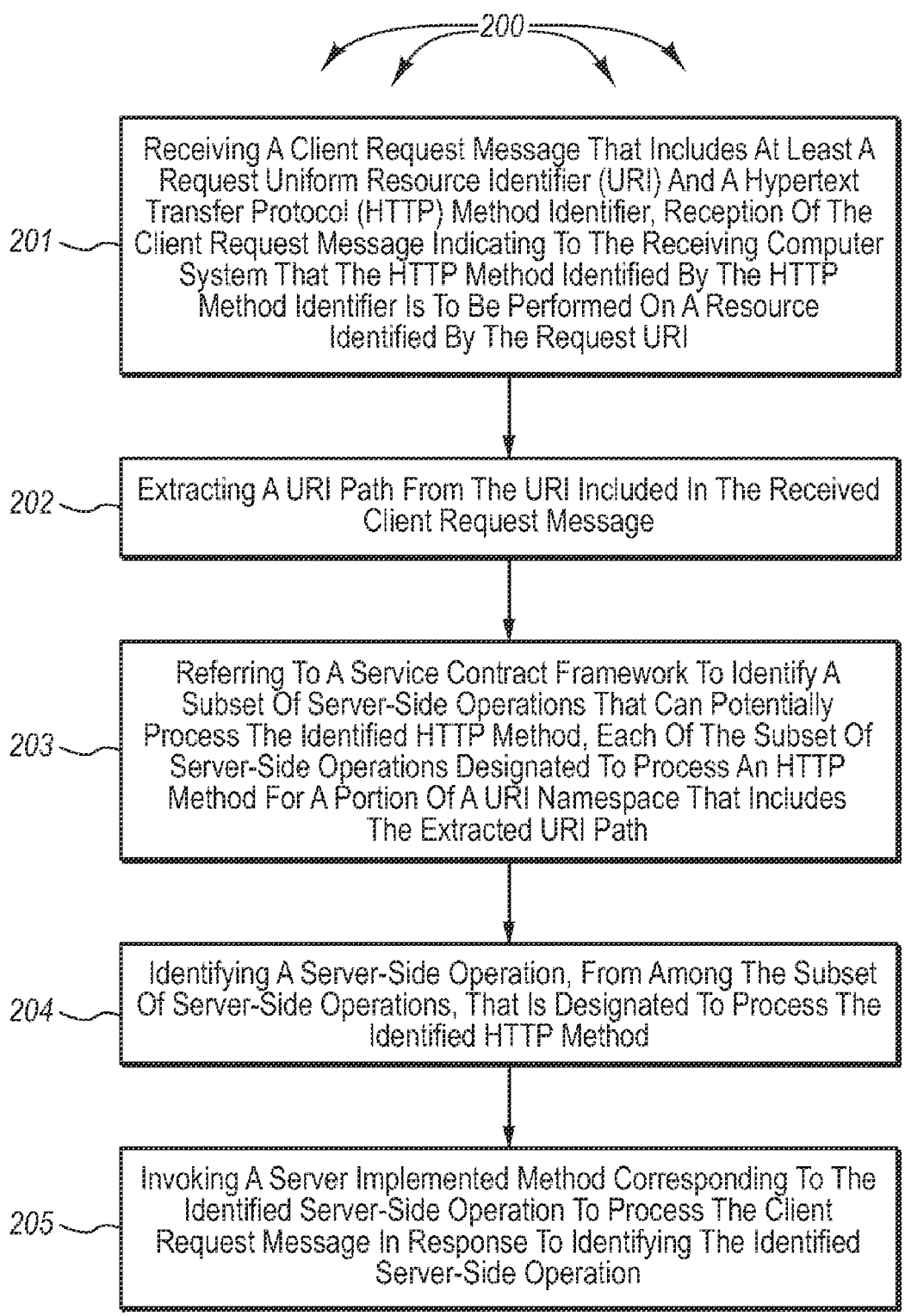
FIG. 2 illustrates a flow chart of an example method for dispatching client requests to appropriate server-side methods.

FIG. 2 illustrates a flow chart of an example method 200 for dispatching client requests to appropriate server-side methods. The method 200 will be described with respect to the components and data in computer architecture 100.

Method 200 includes an act of receiving a client request message that includes at least a request Uniform Resource Identifier (URI) and a HyperText Transfer Protocol (HTTP) method identifier, reception of the client request message indicating to the receiving computer system that the HTTP method identified by the HTTP method identifier is to be performed on a resource identified by the request URI (act 201). For example, Web server 106 can receive request message 121 including at least URI 122 and HTTP method token 123. Request message 121 can also optionally include data 124 (e.g., that is to be used to update content at server computer system 102). Reception of request message 121 indicates to Web server 106 that the HTTP method identified by HTTP method token 123 is to be performed on a resource identified by URI 122.

Method 200 includes an act of extracting a URI path from the URI included in the received client request message (act 202). For example, Web server 106 and/or dispatch module 107 can extract URI path 132 (the path portion of URL 122) from URL 122. URI path 132 can identify a particular resource within the URI namespace of server computer system 102.

Method 200 includes an act of referring to a service contract framework to identify a subset of server-side operations that can potentially process the identified HTTP method, each of the subset of server-side operations designated to process an HTTP method for a portion of a URI namespace that includes the extracted URI path (act 203). For example, comparison module 108 can refer to service contract framework 111 to identify transfer contract subset 117. Comparison module 108 can compare URI path 132 to the URI path for each transfer contract in service contract 111 to determine if URI path 132 is contained within (or matches) the URI path for each transfer contract.

For example, comparison module 108 can compare URI path 132 to URI path 113B to determine if URI path 132 is contained within (or matches) URI path 113B. URI paths within transfer contracts can include wildcard operators that carve out portions of the server-side URI namespace. Thus, a URI path for a single transfer contract can correspond to client requests that identify resources across a range of different URIs. As depicted, transfer contract subset 117 includes transfer contracts 112B and 112C (and can also include any other transfer contracts that have a URI path containing (or matching) URI path 132).

Method 200 includes an act of identifying a server-side operation, from among the subset of server-side operations, that is designated to process the identified HTTP method (act 204). For example, comparison module 108 can identify transfer contract 112B, from among the transfer contracts in transfer contract subset 117. Transfer contract 112B can be designated to process the HTTP method (e.g., PUT, GET, etc.) identified by HTTP method token 123.

To identify a transfer contract, comparison module 108 can compare the HTTP method identified by HTTP method token 123 to the HTTP method of each transfer contract in transfer contract subset 117. For example, comparison module 108 can compare the HTTP method identified by HTTP method token 123 to HTTP method 114B. When comparison module 108 finds a match between HTTP methods, the corresponding transfer contract is designated to process the HTTP method. For example, comparison module can find that the HTTP method identified by HTTP method token 123 matches HTTP method 114B and thus transfer contract 112B is designated to process the HTTP method identified by HTTP method token 123.

Method 200 includes an act of invoking a server implemented method corresponding to the identified server-side operation to process the client request message in response to identifying the identified server-side operation (act 305). For example, dispatch module 107 can invoke method 109B. Dispatch module 107 can refer to transfer contract 112B to access server method reference 116B (referencing method 109B). Using server method reference 116B, dispatch module 107 can then send invoke command 126 to instantiate an instance of method 109B.

Method 109B can return results 127 back to Web serer 106. Web server can include results 127 in response message 128 and send response message 128 to Computer system 101. Web browser 104 can receive response message 128 and process results 127 accordingly.

Embodiments of the present invention can utilize a variety of differently formatted service contract frameworks. The following code sample depicts one example of a service contract framework (line numbers are included for reference but are not actually part of the code):

```
 1.  [ServiceContract]
 2.  interface ISample2
 3.  {
 4.      [OperationContract]
 5.      void A( );
 6.
 7.      [OperationContract]
 8.      [HttpTransferContract( Path="Foo" )]
 9.      void B( );
10.
11.      [OperationContract]
12.      [HttpTransferContract( Path="Foo", Method="POST" )]
13.      void C( );
14.
15.      [OperationContract]
16.      [HttpTransferContract( Path="*", Method="PUT" )]
17.      void D( );
18.
19.      [OperationContract]
20.      [HttpTransferContract( Path="Foo/{0}/Bar" )]
21.      void E( );
22.
23.      [OperationContract( Action="*" )]
24.      void F( );
25.  }
```

As depicted the service contract framework example, includes a plurality operation contracts elements (lines 4, 7, 11, 15, 19, and 23). Some of the operation contracts are associated with HttpTransferContract elements (lines 8, 12, 16, 20) containing various name/value pairs representing a URI path and/or an HTTP method. Each operation contract is also associated with a also contains corresponding server implementation method (lines 5, 9, 13, 17, 21, and 24) that can be invoked. Comparison module 108 can compare a URI path from a received URL and an HTTP method identified by a received HTTP method token, to the contained name/value pairs to attempt to identify a match. When a match is identified the corresponding server implementation method can be invoked.

Paths can include wildcards that can match a plurality of URIs within a server-side name space. For example, line 16 includes a path of "*" that represents an entire server-side name space. Thus, the HttpTransferContract at line 16 would match any URI received in a client request. Line 17 includes a path of "Foo/{0}/Bar". The "{0}," portion of the path is matches any value within that segment of the path. A value in an actual received URI within that segment of the path can also be provided to the method "void E( )". For example, for the received URI "Foo/26/Bar", the value 26 can be provided to the method "void E( )".

Various default and override behaviors are also be implemented in service contract framework. For example, by default all operations can be bound to HTTP GET and match a URI path segment equal to the name of the server implemented method. Thus, in the example service contract framework an HTTP request indicating an HTTP GET and the path "/A" can cause "void A( )" to be invoked.

In absence of a specified method name/value pair, an HTTP GET method can be used as a default HTTP method. For example, an HTTP request indicating an HTTP GET and the path "/foo" can cause "void B( )" to be invoked.

On the other hand, an HTTP request indicating an HTTP PUT and the path "/foo" can cause "void C( )," to be invoked. The HttpTransferContracts at lines 8 and 12 may initially get included in a transfer contract subset for the request. From the transfer contract subset the HttpTransferContract at line 12 can then be identified as the designated HttpTransferContract upon comparing HTTP methods.

An HTTP request indicating an HTTP POST and the path "/x/y/z" can cause "void D( )" to be invoked. The HttpTransferContract at line 16 matches HTTP PUTS to any URI path due to the wildcard operator "*".

An HTTP request indicating an HTTP GET and the path "Foo/X/Bar" can cause "void E( )" to be invoked (default behavior can bind to HTTP GET). The HttpTransferContract at line 20 matches any value in the middle segment due to the wildcard operator "{0}". The value X can also be passed "void E( )" as a parameter.

An HTTP request indicating an HTTP GET and the path "/x/y/z" can cause "void F( )" to be invoked. Since none of the depicted HttpTransferContracts match both the URI path "x/y/z" and HTTP GET, the operation contract at line 23 serves to catch any otherwise unmatched requests.

Embodiments of the invention also permit server operation to be parameterized. The following code sample depicts an example of lines 11-13 of the above server contract framework that permits a server operation to be parameterized.

```
[OperationContract]
[HttpTransferContract( Path="Foo", Method="POST" )]
void C( int parameter1, string parameter2 );
```

As depicted, the server implement method "void C" can be invoked with an integer and a string parameter. Thus, embodiments of the invention permit parts of an incoming HTTP request to be considered as parameter values by the server. Data objects returned from server implementation methods can be marshaled into HTTP response messages in a similar manner.

Accordingly, embodiments of the invention provide a uniform mechanism to dispatch HTTP requests to designated server implemented methods based solely on URI path and HTTP method. That is, an HTTP request can be dispatched to a designated server implemented method without having to include additional dispatch metadata within the HTTP request (e.g., in a SOAP envelope).

However, embodiments of the invention also permit the use of the same contract definition (the programming artifact which defines the contract) to be reused by both a simple HTTP network infrastructure as well as a SOAP-based networking infrastructure. That is, different dispatching models can be layered on top of the same contract definition. For example, the default behavior at lines 23-24 of the example service contract framework dispatches HTTP requests based on a SOAP action value at the SOAP layer, when no match is identified at the HTTP layer. As depicted, the wildcard operator "*" is used to match any otherwise unmatched request.

However, more complex matching functionality at the SOAP layer can be implemented when no match is identified at the HTTP layer. For example, an HTTP request may include some SOAP dispatch data even though HTTP layer dispatching is being utilized at a server (e.g., data 124 may be SOAP dispatch data). Thus, when a match is not identified at the HTTP layer (e.g., based solely on the URI path and HTTP method), a Web server can process the SOAP dispatch data to determine how to dispatch the HTTP request.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, the computer system including a URI namespace for identifying available resources of the computer system, a method for dispatching a client request message to an appropriate server-side method for processing the client request message, the method comprising:

an act of receiving a client request message that includes at least a request Uniform Resource Identifier (URI) and a HyperText Transfer Protocol (HTTP) method identifier, reception of the client request message indicating to the computer system that the HTTP method identified by the HTTP method identifier is to be performed on a resource identified by the request URI;

an act of extracting a URI path from the URI included in the received client request message, the extracted URI path identifying a path within the URI namespace;

an act of accessing a service contract framework, the service contract framework including a plurality of transfer contracts, each transfer contract of the, plurality of transfer contracts indicating that at least one of the server implemented methods is to be invoked when a request matches the transfer contract, at least one transfer contract of the plurality of transfer contracts including the URI path identifying the path within the URI namespace and indicating a first server implemented method of the plurality of server implemented methods that is to be invoked when a first request matches the at least one transfer contract;

an act of comparing the extracted URI path and the HTTP method to each of the plurality of transfer contracts in accordance with designated behaviors to identify an indicated server implemented method that is to be invoked to process the client request message, including:

an act of identifying a subset of transfer contracts of the plurality of transfer contracts that match the extracted URI by comparing the extracted URI path to the URI path of each of the at least one transfer contracts including a URI path; and an act of identifying at least two transfer contracts of the plurality of transfer contracts, from among the subset of transfer contracts, that matches to the HTTP method in the client request message; and utilizing the designated behaviors to select an appropriate transfer contract among the at least two transfer contracts; and an act of invoking the server implemented method indicated in the selected transfer contract server side operation to process the client request message processing the client request message causing the identified HTTP method to be performed on the resource identified by the extracted URI.

2. The method as recited in claim 1, wherein the act of receiving a client request message that includes at least a request Uniform Resource Identifier (URI) and a HyperText Transfer Protocol (HTTP) method identifier comprises receiving a client request message requesting that content be returned to a Web browser.

3. The method as recited in claim 1, wherein the act of receiving a client request message that includes at least a request Uniform Resource Identifier (URI) and a HyperText Transfer Protocol (HTTP) method identifier comprises receiving a client request message requesting that the computer system be updated with data included in the client message request.

4. The method as recited in claim 1, wherein the act of receiving a client request message that includes at least a request Uniform Resource Identifier (URI) and a HyperText Transfer Protocol (HTTP) method identifier comprises an act of receiving a client request message that includes an HTTP method token identifying an HTTP method selected from among OPTIONS, GET, HEAD, POST, PUT, DELETE, TRACE, CONNECT.

5. The method as recited in claim 1, wherein the act of extracting a URI path from the URI included in the received client request message comprises an act of extracting an URI path from a URI that was received at a Web browser and then transmitted to the computer system.

6. The method as recited in claim 1, wherein the act of accessing a service contract framework comprises an act of accessing a plurality of operation contracts that contain the transfer contracts.

7. The method as recited in claim 1, wherein the act of identifying a subset of transfer contracts that match the extracted URI path comprises an act of matching the extracted URI path to a wildcard operator included in the URI path of a transfer contract, the wildcard operator configured to match any value for at least one segment of the URI path.

8. The method as recited in claim 1, wherein the act of comparing the extracted URI and the HTTP method to each of the transfer contracts comprises:

an act of referring to one or more mappings between HTTP requests and server implementation methods that are declaratively specified in metadata; and an act of inspecting the metadata to identify one or more server-side operations that can potentially process the identified HTTP method.

9. The method as recited in claim 1, wherein the act of identifying a transfer contract, from among the subset of transfer contracts, that corresponds to the HTTP method in the client request message comprises an act of matching the HTTP method in the client request message to the HTTP method of a transfer contract.

10. The method as recited in claim 1, wherein the act of identifying a transfer contract, from among the subset of transfer contracts, that corresponds to the HTTP method in the client request message comprises an act of identifying a server implemented method that has the same name as the URI path.

11. The method as recited in claim 1, wherein the act of invoking the server implemented method indicated in the selected transfer contract comprises and act of providing values contained in the client request message as parameters to the server implemented method.

12. The method as recited in claim 1, further comprising returning the results of invoking the indicated server implemented method to the client that sent the client request message.

13. A computer program product for use at a computer system, the computer system including a URI namespace for identifying available resources of the computer system, the computer program product for implementing a method for dispatching a client request message to an appropriate server-side method for processing the client request message, the computer program product comprising one or more computer-readable storage media having stored thereon computer-executable instructions that when executed by a processor cause the computer system to perform the following:

receive a client request message that includes at least a request Uniform Resource Identifier (URI) and a HyperText Transfer Protocol (HTTP) method identifier, reception of the client request message indicating to the computer system that the HTTP method identified by the HTTP method identifier is to be performed on a resource identified by the request URI;

extract a URI path from the URI included in the received client request message, the extracted URI path identifying a path within the URI namespace;

access a service contract framework, the service contract framework including a plurality of transfer contracts, each transfer contract of the, plurality of transfer contracts indicating that at least one of the server implemented methods is to be invoked when a request matches the transfer contract, at least one transfer contract of the plurality of transfer contracts including the URI path identifying the path within the URI namespace and indicating a first server implemented method of the plurality of server implemented methods that is to be invoked when a first request matches the at least one transfer contract;

compare the extracted URI path and the HTTP method to each of the plurality of transfer contracts in accordance with designated behaviors to identify an indicated server implemented method that is to be invoked to process the client request message, including:

identifying a subset of transfer contracts of the plurality of transfer contracts that match the extracted URI by comparing the extracted URI path to the URI path of each of the at least one transfer contracts including a URI path; and identifying at least two transfer contracts of the plurality of transfer contracts, from among the subset of transfer contracts, that matches to the HTTP method in the client request message; and utilizing the designated behaviors to select an appropriate transfer contract among the at least two transfer contracts; and invoking the server implemented method indicated in the selected transfer contract server side operation to process the client request message processing the client request message causing the identified HTTP method to be performed on the resource identified by the extracted URI.

14. The computer program product as recited in claim 13, wherein computer-executable instructions that when executed cause the computer system to receive a client request message that includes at least a request Uniform Resource Identifier (URI) and a HyperText Transfer Protocol (HTTP) method identifier comprise computer-executable instructions that when executed cause the computer system to receive a client request message that includes an HTTP method token identifying an HTTP method selected from among OPTIONS, GET, HEAD, POST, PUT, DELETE, TRACE, CONNECT.

15. The computer program product as recited in claim 13, wherein computer-executable instructions that when executed cause the computer system to access a contract framework that comprises computer-executable instructions that when executed cause the computer system to access a plurality of operation contracts that contain the transfer contracts.

16. The computer program product as recited in claim 13, wherein computer-executable instructions that when executed cause the computer system to identify a subset of transfer contracts that match the extracted URI path; and computer-executable instructions that when executed cause the computer system to match the extracted URI path to a wildcard operator included in the URI path of a transfer contract, the wildcard operator configured to match any value for at least one segment of the URI path.

17. The computer program product as recited in claim 13, wherein computer-executable instructions that when executed cause the computer system to compare the extracted URI and the HTTP method to each of the transfer contracts; and computer-executable instructions that when executed cause the computer system to refer to one or more mappings between HTTP requests and server implementation methods that are declaratively specified in metadata; and inspect the metadata to identify one or more server-side operations that can potentially process the identified HTTP method.

18. The computer program product as recited in claim 13, wherein computer-executable instructions that when executed cause the computer system to identify a transfer contract, from among the subset of transfer contracts, that corresponds to the HTTP method in the client request message; and computer-executable instructions that when executed cause the computer system to match the HTTP method in the client request message to the HTTP method of a transfer contract.

19. The computer program product as recited in claim 13, wherein computer-executable instructions that when executed cause the computer system to invoke the server implemented method indicated in the selected transfer contract; and computer-executable instructions that when executed cause the computer system to provide values contained in the client request message as parameters to the server implemented method.

20. A computer system comprising
one or more processors;
system memory; and
one or more computer-readable media having stored thereon computer-executable instructions representing a dispatch module, the dispatch module configured to dispatch HTTP requests to appropriate server implementation methods, wherein the computer-executable instructions, when executed by a processor, cause the dispatch module to perform the following:

receive a client request message that includes at least a request Uniform Resource Identifier (URI), parameters, and a HyperText Transfer Protocol (HTTP) method identifier, reception of the client request message indicating to the computer system that the HTTP method identified by the HTTP method identifier is to be performed on a resource identified by the request URI in accordance with the parameters;

extract a URI path from the URI included in the received client request message, the extracted URI path identifying a path within the URI namespace;

extract the parameters from the received client request message, the parameters for submission to a server implemented method;

access a service contract framework, the service contract framework including a plurality of transfer contracts, each transfer contract in the plurality of transfer contracts indicating that at least one of a plurality of server implemented methods that is to be invoked when a request matches the transfer contract, a first transfer contract in the plurality of transfer contacts including an expressly indicated URI path identifying a path within the URI namespace and indicating a first server implemented method that is to be invoked when a request matches the first transfer contract, a second transfer contract in the plurality of transfer contracts including a URI path with a wildcard operator and indicating a second server implemented method that is to be in invoked when a request matches the second transfer contract, wherein the wildcard operator carves out a portion of the URI namespace such that the second transfer contract can match client requests that identify resources from a range of different URIs;

compare the extracted URI path, the extracted parameters, and the HTTP method to each of the transfer contracts, including the first and second transfer contracts, in accordance with defined default and override behaviors to identify an indicated server implemented method that is to be invoked to process the client request message, including:

identifying a subset of transfer contracts, including the first and second transfer contracts, that match the extracted URI path by comparing the extracted URI path to the URI path of each of the at least one transfer contracts including a URI path, wherein the extracted URI path matches the second transfer contract by matching a portion of the extracted URI path to the wildcard operator; and identifying at least two transfer contracts, from among the subset of transfer contracts, that matches to the HTTP method in the client request message;

utilizing the defined override behaviors to select an appropriate transfer contract from among the at least two transfer contracts; and invoke the server implemented method indicated in the selected transfer contract to process the client request message in accordance with the selected parameters, processing the client request message causing the identified HTTP method to be performed on the resource identified by the extracted URI.

* * * * *